United States Patent Office 2,717,471
Patented Sept. 13, 1955

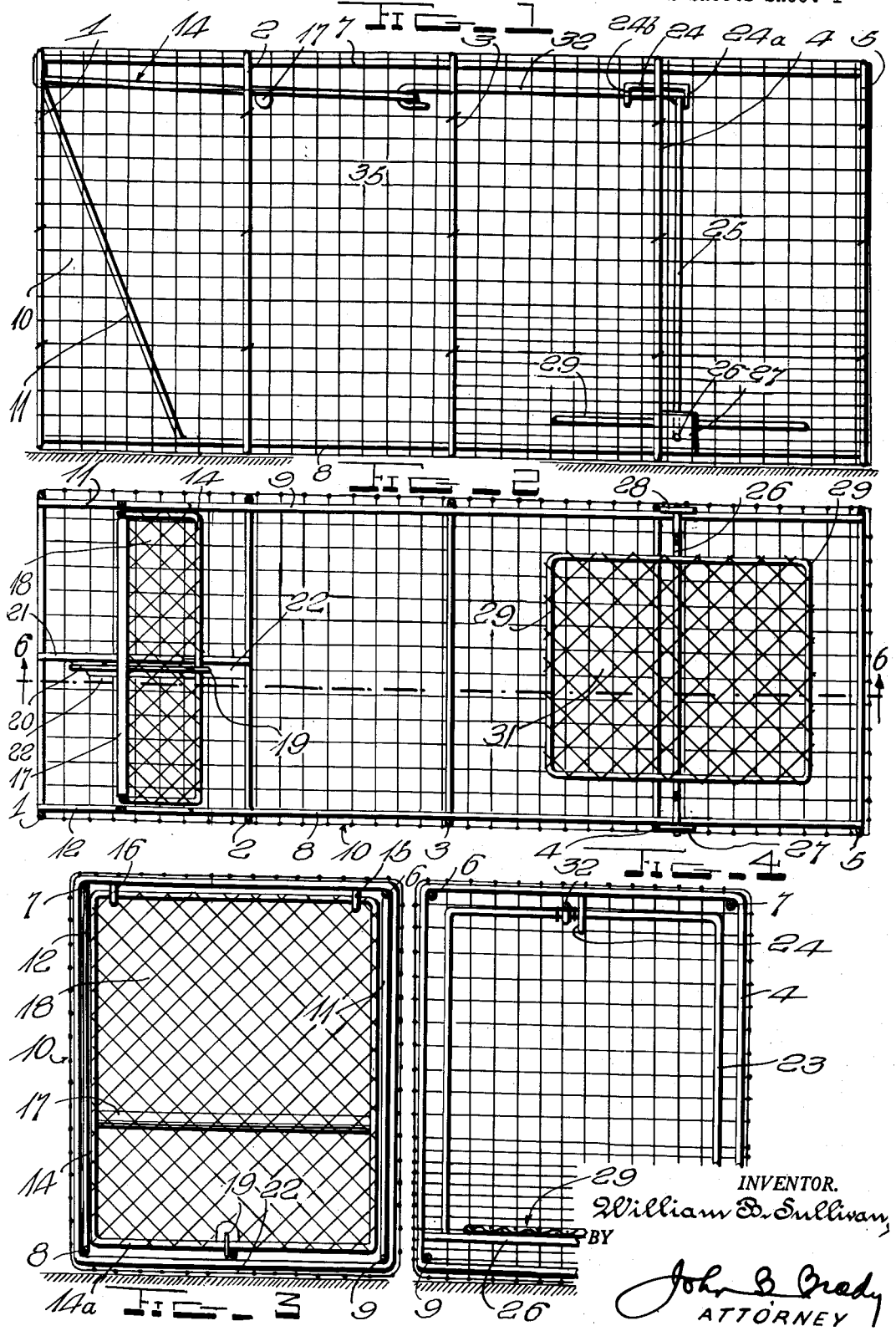

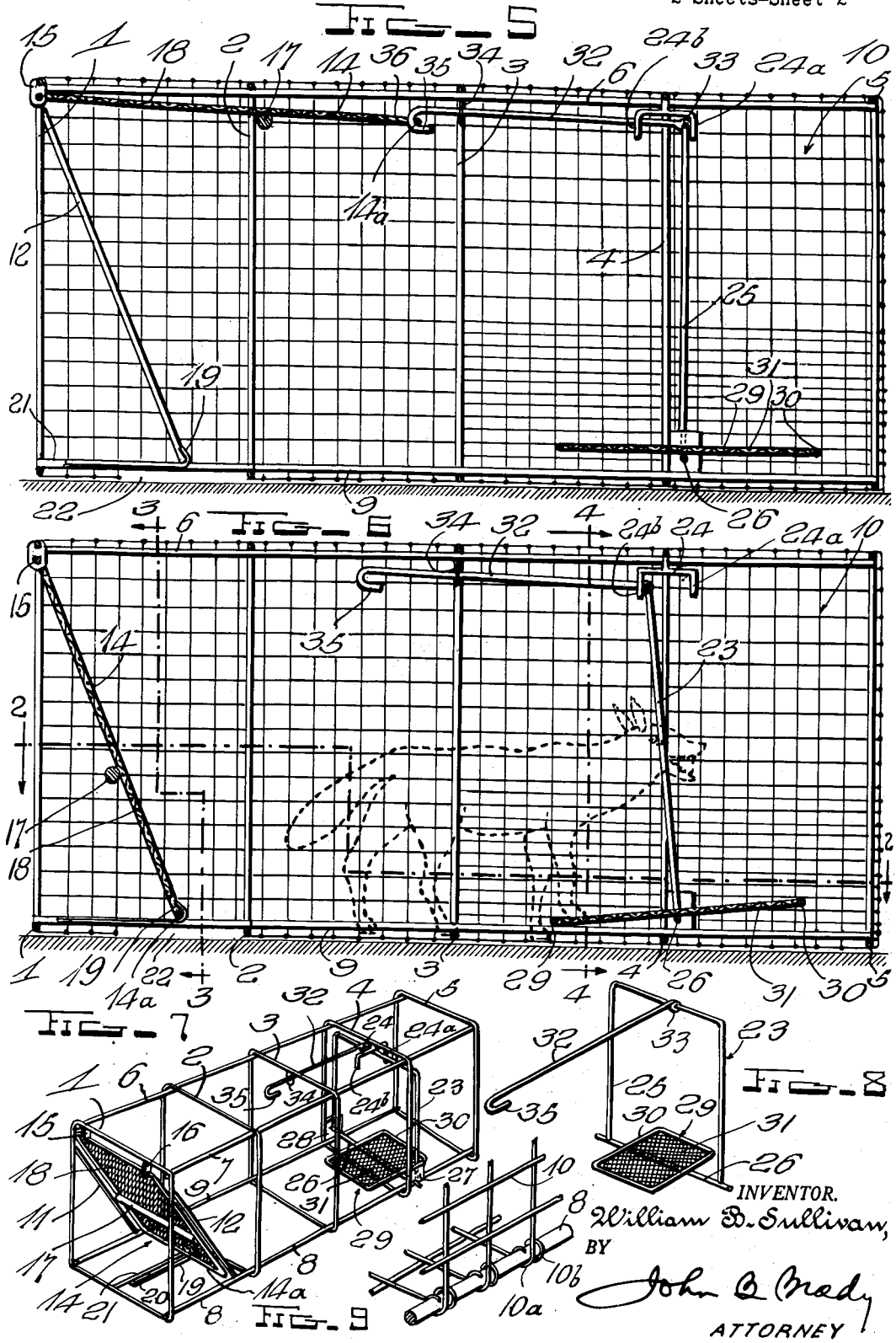

2,717,471

ANIMAL TRAP

William B. Sullivan, Valdosta, Ga.

Application December 29, 1950, Serial No. 203,243

1 Claim. (Cl. 43—61)

My invention relates broadly to animal traps and more particularly to an improved construction of imprisoning trap designed to catch coons, opossums, wild cats, skunks, and other similar animals without in any way hurting or injuring the animals.

One of the objects of my invention is to provide a reliable construction of animal trap which is sturdy and permanent in character and has a relatively long useful period of operation for trappers.

Another object of my invention is to provide a construction of animal trap which is very substantially constructed from a metallic frame over which a relatively heavy wire mesh is adapted to be stretched and welded at the necessary points of connection with the metallic frame for housing all of the operating parts of the trap in a manner in which they cannot be tampered with.

Another object of my invention is to provide a construction of animal trap employing a delicately balanced treadle upon which a light downward pressure applied at the front thereof is sufficient to effect a quick striking pulse for releasing the door of the trap which is adapted to be gravitationally released for imprisoning the animal so quickly that the animal has insufficient time to escape from the trap.

Another object of my invention is to provide a construction of yoke attached to a delicately balanced treadle within a caged trap where the yoke is swingable through a restricted vertical plane under conditions of a light downward pressure applied at the front of the treadle for actuating a latch which normally holds open the door of the trap, permitting the door to gravitationally drop to a position where it is secured against opening by the imprisoned animal by a safety latch at the bottom of the trap.

Still another object of my invention resides in a lever arrangement connected with a tiltable platform within an animal trap of the imprisoning type where the movement of the lever is controlled within limits for effecting the unlatching of a gravitationally suspended swinging door at the open end of the trap for gravitationally dropping the door so quickly that the imprisoned animal is unable to escape and is imprisoned in the trap without injury.

Other and further objects of my invention reside in the construction of door actuating mechanism and release and latching means therefor as set forth more fully in the specification hereinafter following by reference to the accompanying drawings in which:

Figure 1 is a side elevational view of the trap in position preparatory for the entry of an animal to be imprisoned therein; Fig. 2 is a horizontal longitudinal sectional view taken through the trap substantially on line 2—2 of Fig. 6 and illustrating the position of the parts of the trap after the treadle mechanism has been actuated and after the door of the trap has dropped to a latched position for imprisoning the animal within the trap; Fig. 3 is a vertical sectional view taken substantially on line 3—3 of Fig. 6 and illustrating the door of the trap in gravitated latched position for imprisoning the animal within the trap; Fig. 4 is a vertical sectional view taken substantially on line 4—4 of Fig. 6 and illustrating the treadle moved to an actuating position under pressure applied by the imprisoned animal against the treadle for gravitationally dropping the door of the trap to latched position behind the animal before the animal has the opportunity of escaping imprisonment in the trap; Fig. 5 is a vertical longitudinal sectional view taken through the trap showing the trap prepared for entry of an animal and illustrating the treadle in delicately balanced position preparatory for actuation by an animal entering the trap; Fig. 6 is a longitudinal sectional view similar to the view shown in Fig. 5 but illustrating the delicately balanced treadle moved to actuated position by light downward pressure by the animal at the front of the treadle for pushing forward the top extremity of the yoke attached to and under the treadle and extending to a position near the top of the cage for thus instantly releasing a lock which holds open the door of the trap, permitting the door which is pivoted at the top of the front of the cage to quickly drop and to be secured against opening from inside the cage by a safety hook which is engaged at the bottom of the trap; Fig. 7 is a perspective view of the metallic frame of the trap showing the treadle mechanism, the operating means associated therewith, and illustrating the door of the trap released and dropped to a position closing the front end of the trap against escape of the imprisoned animal; Fig. 8 is a perspective view of the treadle mechanism per se on a somewhat enlarged scale and illustrating the release means connected therewith and which normally holds open the door of the trap; and Fig. 9 is a fragmentary view showing more clearly the manner of constructing the trap by stretching heavy mesh wire over the metallic frame and securing the ends of the wire to the metallic frame by an electrical welding process at the necessary points of contact.

My invention is directed to equipment for trappers which will have a long and useful life and is reliable in operation for catching such animals as coons, opossums, wild cats, skunks and other similar animals without hurting or injuring the animals. Occasionally a stray dog or house cat is caught in such traps but the trap of my invention does them no harm and offers them all necessary protection until released by the trapper. The trap of my invention is formed by a relatively heavy mesh wire which may be stretched taut over a skeleton frame formed by a multiplicity of frame sections secured at spaced intervals along longitudinally extending frame members. One of the frame sections serves as a mounting means for a delicately balanced treadle mechanism near the end of the interior of the trap where the treadle mechanism is free to tilt without restriction between two limits. The mounting of the treadle is such that there is substantially no inertia to the movement thereof under conditions of a light downward pressure applied at the front of the treadle by an animal resting a foot upon the treadle in approaching bait which may be located at the extreme interior end of the enclosing trap. Another of the frame sections at the entrance end of the trap serves as a pivoting means for the door of the trap which may gravitate from a latched position at the top of the trap upon movement of the treadle mechanism for closing the front end of the trap in a manner in which the door is securely latched against the escape of the imprisoned animal. The construction set forth herein has been found to be highly practical in manufacture, production, use and operation as there are a minimum number of parts which require maintenance or servicing. Thus extended trapping operations may be carried on by distributing large numbers of the traps of my invention over an extensive area making it only necessary for the trapper to make routine inspections of the distributed traps for collecting the imprisoned game, and unlatching the dropped doors for reengagement with the latch mechanism connected with the delicately balanced treadle mechanism in preparation for re-use after replenishment of bait.

Referring to the drawings in more detail, reference characters 1, 2, 3, 4 and 5 designate frame sections of heavy gauge rod or wire rigid material which are disposed at spaced intervals along longitudinally extending rigid wire frame members 6, 7, 8 and 9 at each inside corner thereof. The frame sections 1–5 are welded to the longitudinally extending frame members 6–9 and constitute a rigid skeleton frame as shown more particularly in the perspective view in Fig. 7.

The skeleton frame formed by the spaced frame sections 1–5 and the longitudinally extending frame members 6–9 serves as a box-like enclosure over which the relatively heavy gauge and relatively small mesh wire 10 is stretched taut. The junctions of the frame members 6–9 with the frame sections 1–5 are electrically welded at each corner. The terminating ends of the relatively heavy gauge, relatively small mesh wire 10 are wrapped around one of the frame members such as is represented at 8 as indicated at 10a and 10b and welded thereto forming a secure enclosure for the box-like trap.

The frame section 4 which is located near the interior end of the enclosure serves as a mounting means for the delicately balanced treadle mechanism while the frame section 1 at the forward entrance end of the enclosure for the trap serves as a mounting means for the pivotally mounted door of the trap. The two frame sections 1 and 4 are so spaced along the frame members 6–9 that when the cage is complete by the wrapping and securing of the relatively small mesh wire 10 around the frame the proper proportions for the cage are secured permitting the entry and imprisonment of an animal.

I provide an angularly disposed framing constituted by frame members 11 and 12 interconnecting the frame section 1 and the horizontally extending frame members 8 and 9 forming reinforcement for the cage structure and also serving as a framing for receiving the gate 14 when the gate is in a dropped or gravitated position as represented in Figs. 2, 3, 6 and 7. The gate 14 is formed by a rectangular framing member which is pivoted at its top marginal edge in lugs 15 and 16 depending downwardly from the top of frame section 1. The gate 14 carries a relatively massive transverse bar 17 below the center of gravity of the gate 14 which assists in the gravitation of the gate 14 from its open position depicted in Figs. 1 and 5 to its closed position shown in Figs. 2, 3, 6 and 7. The framing forming the gate 14 is covered by relatively heavy gauge relatively small mesh wire 18. The lower marginal edge of the gate 14 effects latching engagement and insures a reliable lock with the upwardly extending end of a longitudinally extending resilient hook 19. The resilient hook 19 has its supporting end thereof welded at 20 to the longitudinally extending strut 21 which is welded between the bottom of frame section 1 and frame section 2 in such a position that the resilient end of the hook 19 is capable of being yieldably displaced upwardly and downwardly in effecting latching engagement and disengagement with the marginal edge of frame section 14 forming the gate. To permit the displacement of resilient hook 19 in a vertical plane, I provide a longitudinally extending narrow slit 22 in the bottom of the wire mesh 10 forming the wrapping for the cage to enable a small hand tool to be inserted through the bottom of the cage for pulling down the resilient end of hook 19 to a position in which the hook 19 is displaced through slit 22 and free of engagement with the framing 14 of the gate for enabling the gate to be raised for retrieving the imprisoned animal from the trap and preparing the trap for resetting and reuse. The resiliency of hook 19 is such that the hook may be displaced through a very substantial angle from the welded connection 20 as a center.

The frame section 4 which provides mounting means for the delicately balanced treadle mechanism shown more clearly in Fig. 8 at 23 is provided at its top with a longitudinally extending downwardly projecting limit stop member 24 having a rearward limit stop downward projection 24a and a forward downwardly projecting limit stop projection 24b. These limit stops control the extent to which the delicately balanced treadle mechanism 23 may shift.

The treadle mechanism 23 comprises an upwardly extending yoke 25 which substantially conforms with the interior contour of frame section 4 of the cage. The yoke 25 terminates at spaced positions on the transversely extending bar 26 which is pivotally mounted at opposite ends in the vertically extending bearing members 27 and 28 welded to the exterior of the frame members 8 and 9 and serving as pivotal mountings for bar 26.

The bar 26 carries the treadle 29 thereon formed by a rectangular frame 30 welded to bar 26 and with a relatively heavy gauge relatively small mesh wire 31 stretched thereover and constituting a platform normally maintained in a balanced horizontal position as represented in Figs. 1 and 5 and free to be instantly displaced by the light downward pressure of the foot of an animal on the front of the treadle as represented in Fig. 6.

The treadle mechanism includes a longitudinally extending link member 32 which is pivotally connected at 33 with the center of the top of the yoke 23. The link member 32 extends longitudinally and centrally of the cage in a forward direction and through a downwardly depending loop member 34 which guides the link 32 in a forward and backward direction. The link member 32 terminates at its forward end in a hook 35 which normally engages the end bar 14a of the gate 14 for maintaining the gate 14 in the open position illustrated in Figs. 1 and 5 with the pivoted connection 33 between link 32 and yoke 23 normally resting against the downwardly depending limit stop 24a and with the treadle 29 in balanced horizontal position as shown in Figs. 1 and 5. When the treadle 29 is shifted by the light downward pressure of the animal upon the front end of the treadle 29 as illustrated in Fig. 6 the yoke 23 is shifted out of abutting relation with said limit stop 24a and into abutting relation with limit stop 24b before the forward end of treadle 29 establishes pressure relation with the base structure of said cage and hook 35 is moved forward in the slot 36 provided in the wire mesh 18 of gate 14 freeing the lower bar 14a from engagement with the end of hook 35 whereupon gate 14 gravitates under its own mass assisted by the weight 17 of the transverse bar to the position shown in Figs. 6 and 7 wherein the gate 14 is positively latched by resilient hook 19. The latched position of gate 14 is one in which the gate is angularly disposed in a plane across the end of the cage as shown in Figs. 6 and 7. This position is reached so quickly that the animal caught within the trap is unable to turn and flee before the gate 14 latches behind resilient hook 19. The latching operation is in the nature of a cam movement in that the lowermost bar 14a of gate 14 strikes the exterior upwardly inclined end of resilient hook 19 and effects a bodily displacement thereof around the welded connection 20 as a center until the end of resilient hook 19 slips over the lowermost bar 14a locking the gate 14 against any position opening from the interior of the cage. As heretofore observed, the only possible manner of opening the gate 14 is to positively displace resilient hook 19 downwardly through slit 22 in the bottom of the cage sufficient to free lowermost bar 14a of frame 14 to enable the cage to be opened to retrieve the imprisoned animal and reset the trap.

The limit stops 24a and 24b are so spaced that when stop 24a is engaged the treadle 19 is perfectly balanced in horizontal spaced relation to the bottom of the cage. When stop 24b is engaged the treadle 29 approaches but does not rest upon the bottom of the cage. The limit stops 24a and 24b are formed substantially in the shape of an inverted U structure directed downwardly and embracing the top bar of the yoke 23 with allowance for lost motion or play therebetween. The fact that hook 35 is free to move horizontally in slot 36 in the mesh 18 of gate 14 in the position shown in Fig. 5 also insures against any restriction in the movement of the delicately balanced treadle mechanism which could produce a reactionary effect. Thus the treadle mechanism 23 is free floating and is not restricted by any confined means so there is no opportunity for the animal in lightly treading upon the treadle 29 to receive an implication or warning that the treadle may form any part of an entrapping mechanism for thus giving time for the animal to turn and flee. Suitable bait is provided adjacent the rear of the trap at the general position of the end frame section 5 to attract the animal.

I have found the trap of my invention highly practical in its construction, manufacture, operation and use. The all metal structure of the trap lends itself to quick and thorough cleaning and fumigation.

While I have described my invention in certain of its preferred embodiments I realize that modifications may be made and I desire that it be understood that no limitations upon my invention are intended other than may be imposed by the scope of the appended claim.

What I claim as new and desire to secure by Letters Patent of the United States is as follows:

A treadle operating mechanism comprising, a frame, a base structure connected with said frame, a treadle, a pivot for mounting said treadle above said base structure, a yoke extending vertically from said treadle comprising a pair of side members interconnected by a transversely extending member, a movement limit device supported on said frame above said base structure and over said transversely extending member, said device including a pair of centrally disposed substantially parallel extending depending spaced members defining opposite limit stops for the path of movement of said transversely extending member as said yoke and treadle rock about the pivot thereof and arranged substantially coplanar with the central longitudinal axis of said frame, one of said depending members being substantially vertically aligned with a vertical plane extending through said pivot of said treadle and the other of said depending members being disposed forwardly of the aforesaid depending member, a pivoted gate disposed at the front end of said frame forwardly of the position occupied by the depending members a link extending from said transversely extending member for securing said gate in set position and a latch actuating member connected with said link, said latch actuating member and said yoke being gravitationally biased into a position in which said transversely extending member abuts against the said depending member which is substantially vertically aligned with the pivot of said treadle, while said treadle is maintained in balanced equilibrium in a substantially horizontal plane through the pivot thereof in spatial relation to said base structure, said treadle being tiltable at one end toward said base structure to a position in which the transversely extending member of said yoke establishes abutting contact with the other of said depending members for limiting the movement of said treadle toward said base structure to a position spaced from said base structure at the tilted end thereof.

References Cited in the file of this patent

UNITED STATES PATENTS

| Number | Name | Date |
|---|---|---|
| 111,771 | Oliver | Feb. 14, 1871 |
| 1,011,207 | Kemp | Dec. 12, 1911 |
| 1,028,435 | Cessna | June 4, 1912 |
| 1,258,011 | James | Mar. 5, 1918 |
| 1,645,444 | Moore | Oct. 11, 1927 |
| 1,797,685 | Hastings | Mar. 24, 1931 |
| 1,843,141 | Arth et al. | Feb. 2, 1932 |
| 2,167,291 | Bowman | July 25, 1939 |
| 2,478,605 | Symens | Aug. 9, 1949 |
| 2,571,841 | Dague | Oct. 16, 1951 |